United States Patent
Qin et al.

(10) Patent No.: US 8,250,393 B2
(45) Date of Patent: Aug. 21, 2012

(54) POWER MANAGEMENT METHOD AND RELATED CHIPSET AND COMPUTER SYSTEM

(75) Inventors: Shuang-Shuang Qin, Taipei (TW); Cheng-Wei Huang, Taipei (TW)

(73) Assignee: Via Technologies, Inc., New Taipei (TW)

(*) Notice: Subject to any disclaimer, the term of this patent is extended or adjusted under 35 U.S.C. 154(b) by 387 days.

(21) Appl. No.: 12/623,546

(22) Filed: Nov. 23, 2009

(65) Prior Publication Data
US 2010/0275045 A1     Oct. 28, 2010

(30) Foreign Application Priority Data
Apr. 24, 2009 (CN) .......................... 2009 1 0135752

(51) Int. Cl.
*G06F 1/26* (2006.01)
*G06F 1/00* (2006.01)
*G06F 3/038* (2006.01)
*G06F 17/00* (2006.01)
*G06F 15/00* (2006.01)
*G11C 5/14* (2006.01)

(52) U.S. Cl. ........ 713/320; 713/322; 713/324; 345/211; 345/418; 345/501; 365/227

(58) Field of Classification Search .................. 713/320, 713/322, 324; 365/227; 345/211, 418, 501
See application file for complete search history.

(56) References Cited

U.S. PATENT DOCUMENTS

| | | | | |
|---|---|---|---|---|
| 6,510,525 | B1 * | 1/2003 | Nookala et al. | 713/324 |
| 6,665,802 | B1 * | 12/2003 | Ober | 713/320 |
| 7,299,370 | B2 * | 11/2007 | George et al. | 713/322 |
| 7,340,624 | B2 * | 3/2008 | Kurakane | 713/322 |

* cited by examiner

*Primary Examiner* — Stefan Stoynov
(74) *Attorney, Agent, or Firm* — Thomas|Kayden (57) ABSTRACT

A power management method for use in a computer system having a processor, a power management module and a phase lock loop circuit (PLL) is provided. The power management module is coupled to a plurality of peripheral modules and the computer system and the processor are capable of being operated in a working state and power saving states. The method includes the following. When the computer system is operated in the working state and the processor is entered into a lowest power consumption state among the power saving states, states of the peripheral modules are detected to determine whether a specific condition has been matched. If the specific condition is matched, the processor is directed to a control state to control the PLL according to a control state configuration.

24 Claims, 5 Drawing Sheets

POWER MANAGEMENT METHOD AND RELATED CHIPSET AND COMPUTER SYSTEM

CROSS-REFERENCE STATEMENT

This Application claims priority of China Patent Application No. 200910135752.8, filed on Apr. 24, 2009, the entirety of which is incorporated by reference herein.

BACKGROUND

1. Technical Field

The disclosure relates generally to power management methods and power management apparatuses and chipsets using the same, and, more particularly to power management methods for controlling processor power states in ACPI (Advanced Configuration and Power Interface) standard for controlling operations of phase lock loops (PLLs) of a computer system.

2. Background

For power saving, the ACPI (Advanced Configuration and Power Interface) standard is used in conventional computer systems, especially in portable computers such as notebooks, for efficiently monitoring and distributing power supply to each device in the computer system. Five ACPI states, such as S0, S1, S3, S4 and S5 states, are commonly utilized in computer systems. Computer systems can normally operate in the normal state (S0 state) and when a computer system is idle for a predetermined period, the computer system enters one of the sleeping states S1 to S5 that offer power-saving. In addition, multiple processor power states are further defined in state S0 of the ACPI.

Figure 1:
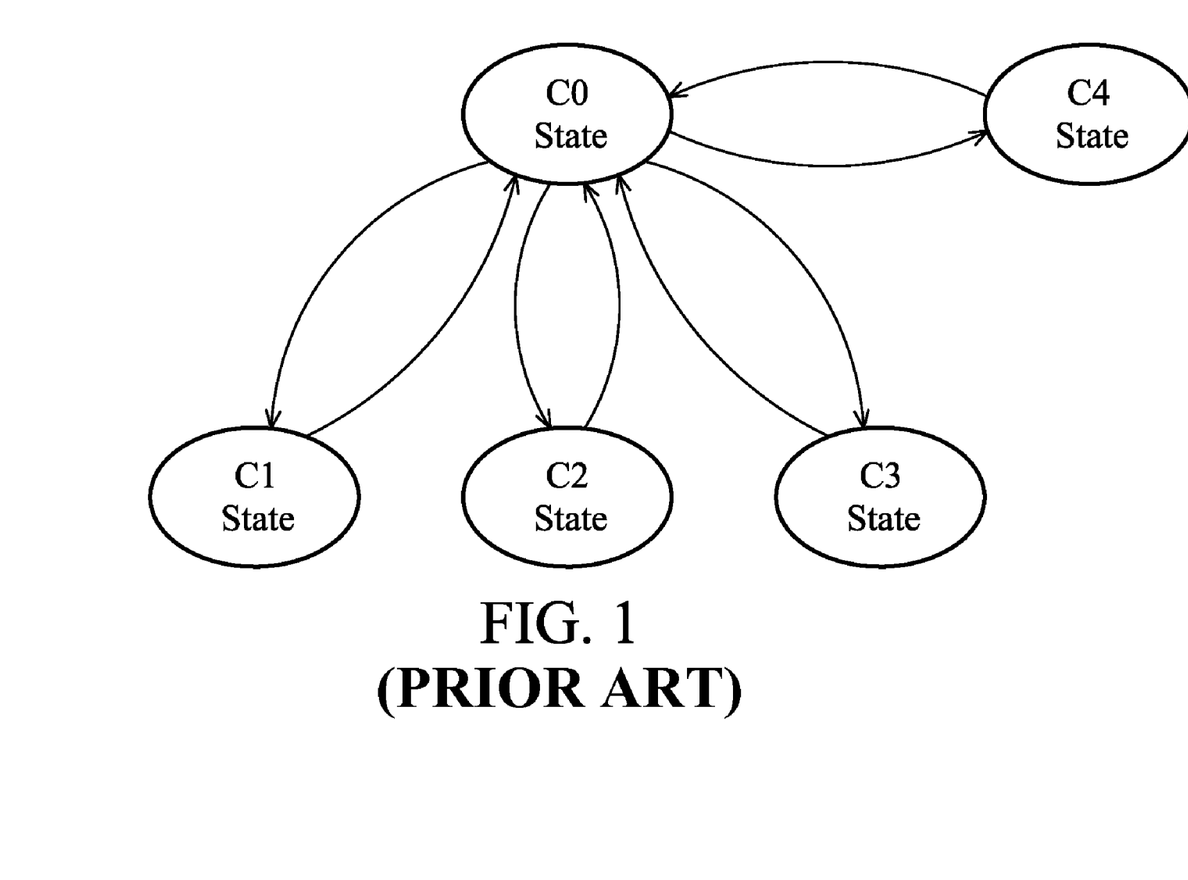
FIG. 1 is a schematic diagram of conventional ACPI-defined processor power states.

FIG. 1 is a schematic diagram of an ACPI-defined processor power state. A CPU executes instructions or manipulates data while in a processor working state, i.e. full running state (C0 state). When the computer system 100 is idle for a predetermined time period, the CPU enters one of the power-saving states C1-C4 according to an operation system (OS). The OS determines which power state the CPU (i.e. the processor) should enter according to the bus master activity status of the computer system. ACPI defines a first (C1), a second (C2), a third (C3), and a fourth (C4) state. The C2 state offers improved power savings over the C1 state, the C3 state offers improved power savings over the C2 state and the C4 state offers improved power savings over the C3 state. Therefore, the C4 state is also referred to as the lowest power consumption state. In the C2 state, the CPU does not execute instructions but the CPU can snoop the bus master access to a main memory. A bus master is an element of a computer system controlling bus paths, such as a USB controller, a PCI controller and so on. The CPU returns from the C2 state to the C0 state when a break event occurs, such as an interrupt or an execution request. In the C3 or C4 state (hereinafter referred to as the C3/C4 state), the CPU does not snoop the bus master access to main memory and stops the clock. Compared with the C3 state, the CPU enters to a deeper sleeping state in the C4 state. Therefore, the C4 state is the lowest power consumption state among all CPU power saving states, i.e. the least power consumption state.

When the OS determines that the computer system is idle for a predetermined period, the CPU enters the C3/C4 state to save power of the computer system efficiently.

For a computer system, a phase lock loop (PLL) is used for generating multiple clock signals with different frequencies according to a received source clock signal input with low frequency so as to generate high clock signal output with different frequencies. Most integrated chips have integrated PLLs to generate different high-frequency clock inputs. Operation of the PLL, however, uses a lot of power. Thus, one way to lower power consumption in a computer system, is to more efficiently control the PLL.

Conventionally, PLL control is mainly based on the ACPI system states, such as the S1 state. In the S0 state, in which the computer system is normally operated, the PLL is always free-running and is not controlled. In other words, power consumption is not controlled and efficiently reduced when the computer system is in normal operation.

Generally, computer systems will not automatically enter sleeping states S1-S5 frequently and the OS will frequently issue commands to configure the processor power state to enter the power saving state C3/C4. Thus, the processor stays in the C3 or C4 state much longer than the computer system in the S1 or other sleeping states.

It is therefore desirable to have a more efficient PLL control method and apparatus for a processor configured in the power saving state (C3/C4 state).

SUMMARY

Power management methods, chipsets and computer systems using the same are provided.

An embodiment of a power management method for use in a computer system having a processor, a power management module coupled to a plurality of peripheral modules and a phase lock loop circuit (PLL) is provided, wherein the computer system and the processor are capable of being operated in a working state and a plurality of power saving states. The power management method includes the following. When the computer system is operated in the working state and the processor is entered into a lowest power consumption state among the power saving states, states of the peripheral modules are detected to determine whether a specific condition is matched. If following detection, the states of the peripheral modules match to the specific condition, the processor is directed to a control state to control the PLL according to a control state configuration.

Another embodiment of a power management method for use in a computer system having a chipset coupled to a clock generator and a processor, including a phase lock loop circuit (PLL), a gating unit, a plurality of peripheral modules and a power management module is provided. The PLL generates at least one second clock signal according to a first clock signal generated by the clock generator. The gating unit is coupled to the PLL for controlling the output of the second clock signal generated by the PLL. Each of the peripheral modules has a low power consumption state. The power management module is coupled to the gating unit, the peripheral modules and the PLL. When the processor enters into a lowest power consumption state among the power saving states, the power management module detects states of the peripheral modules to determine whether a specific condition is matched and if following detection, the states of the peripheral modules match to the specific condition, the power management module directs the processor to a control state to control the PLL according to a control state configuration.

Another embodiment of a power management method for use in a computer system having a clock generator for generating a first clock signal, a processor, and a chipset is provided. The chipset is coupled to the clock generator and the processor, including a phase lock loop circuit (PLL), a gating unit, a plurality of peripheral modules and a power management module. The PLL generates at least one second clock signal according to the first clock signal. The gating unit is coupled to the PLL for controlling the output of the second clock signal generated by the PLL. Each of the peripheral modules has a low power consumption state. The power management module is coupled to the gating unit, the peripheral modules and the PLL, wherein when the computer system is operated in a working state and the processor enters into a lowest power consumption state among the power saving states, the power management module detects states of the peripheral modules to determine whether a specific condition is matched and if following detection, the states of the peripheral modules match to the specific condition, the power management module directs the processor to a control state to control the PLL according to a control state configuration.

Power management methods and chipsets and computer systems using the same may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF DISCLOSED EMBODIMENT

An embodiment is described with reference to FIGS. 2 through 5, which generally relate to power management methods and chipsets and computer systems using the same. In the following detailed description, reference is made to the accompanying drawings which from a part hereof, shown by way of illustration of the disclosed embodiments. The embodiments are described in sufficient detail to enable those skilled in the art to practice the invention, and it is to be understood that other embodiments may be utilized and that structural, logical and electrical changes may be made, without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

Figure 2:
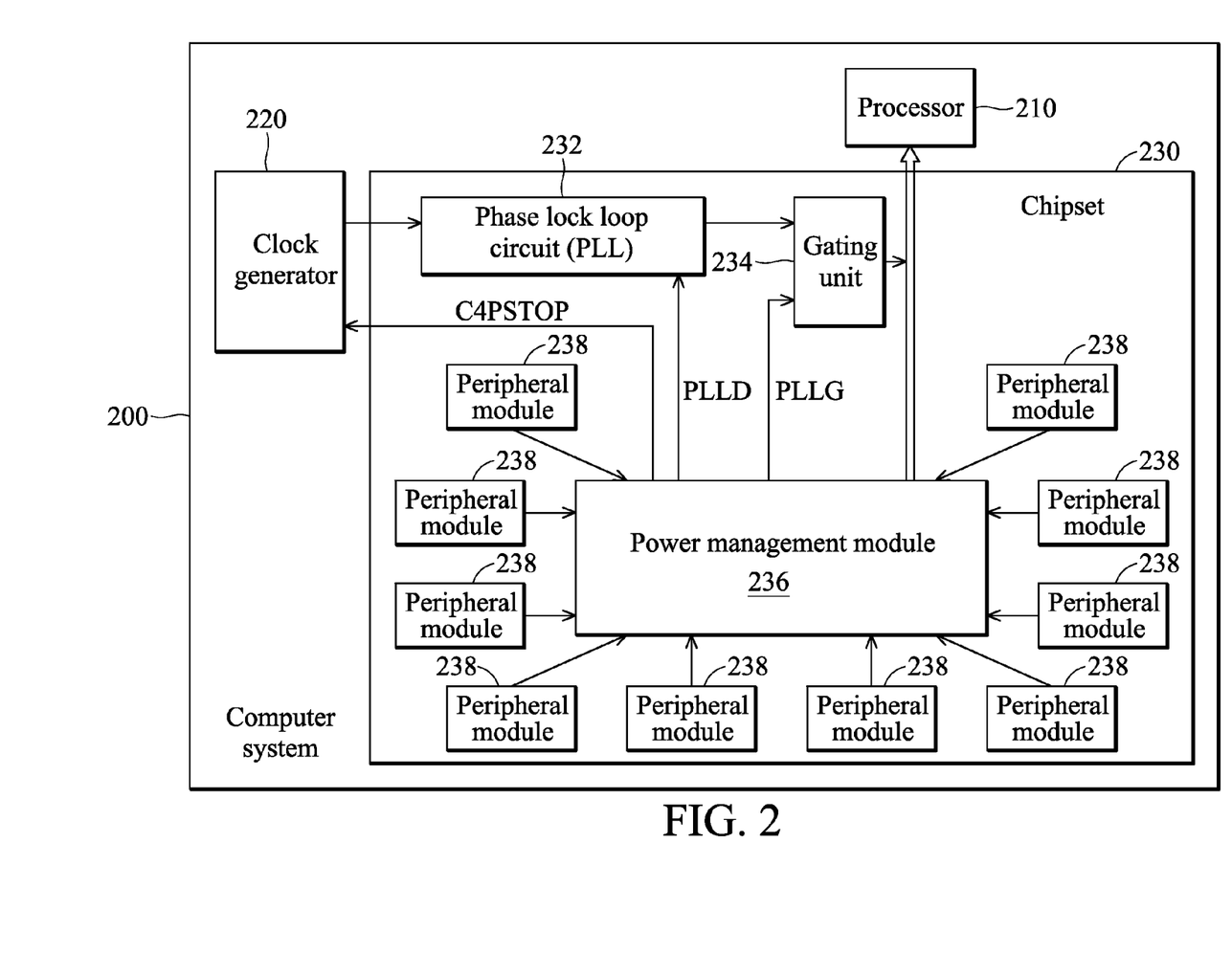
FIG. 2 is a schematic diagram illustrating an embodiment of a computer system of the invention.

FIG. 2 is a schematic diagram illustrating an embodiment of a computer system 200 of the invention. The computer system 200 may be operated in a working state (e.g. S0 state in ACPI standard) and multiple power saving states (e.g. S1-S5 states in ACPI standard) in which the computer system 200 is operated in normal state only when it is operated in the working state while other power saving states are operated in sleeping states. As shown in FIG. 2, the computer system 200 includes a processor 210, a clock generator 220 and a chipset 230. The clock generator 220 is used for generating a first clock signal. The chipset 230 is coupled to the processor 210 and the clock generator 220, wherein the chipset 230 includes a phase lock loop circuit (PLL) 232, a gating unit 234, a power management module 236 and multiple peripheral modules 238. The peripheral modules 238 may be bus master devices or any kinds of input/output device controllers. For example, the peripheral module 238 may include a DRAM controller, a PCIe controller, a HDAC controller, a SMBUS controller, a LPC controller, a real time clock (RTC) generator, an interrupt controller (e.g. 8259), an APIC, a PCI controller, a SPI & SPI flash, a SDIO and memory card interface controller, a keyboard/mouse controller, a graphic controller chip (GFX), a USB controller, a SATA controller and so on, but it is not limited thereto. Each of the peripheral modules 238 has a working state and multiple power saving states, wherein a power saving state that consumes least power is defined as the low power consumption mode. For example, if the peripheral module 238 is a memory controller, the low power consumption mode thereof is defined as being operated in the self-refresh mode for the memory controller. If the peripheral module 238 is a graphic control chip, the low power consumption mode thereof is defined as being operated in the snapshot mode for the graphic control chip. If the peripheral module 238 is a USB controller, the low power consumption mode thereof is defined as being configured all USB devices to be operated in the D3 mode. If the peripheral module 238 is a SATA controller, the low power consumption mode thereof is defined as being configured the SATA devices to be operated in the partial/slumber mode.

The PLL 232 receives a first clock signal generated by the clock generator 220 and generates at least one second clock signal according to the first clock signal in which the frequency of the second clock signal is typically higher than that of the first clock signal. The gating unit 234 is coupled to the PLL 232 for controlling the output of the second clock signal generated by the PLL 232. In one embodiment, the gating unit 234 is further coupled to the power management module 236 and determines whether to gate the output of the second clock signal of the PLL 232, i.e. whether to stop outputting of the second clock signal according to a control signal PLLG (first control signal) from the power management module 236. The PLL 232 is coupled to the power management module 236 and determines whether to power down (or turn off) the PLL 232 according to a control signal PLLD (second control signal) from the power management module 236.

The power management module 236 is coupled to the gating unit 234 and all of the peripheral modules 238 for performing a power management method of the invention that controls operation of the PLL 232 based on the power saving state of the processor 210.

Figure 3:
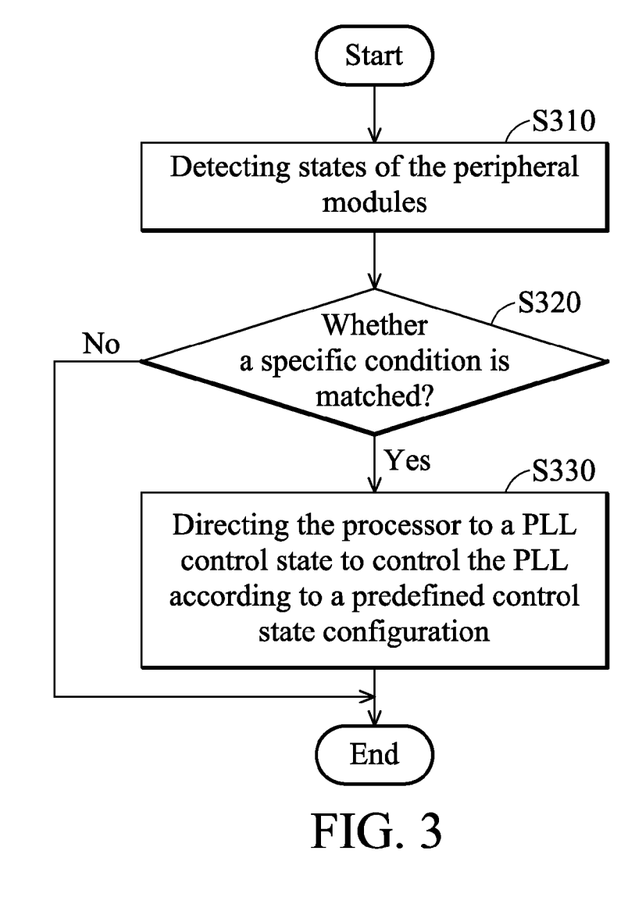
FIG. 3 is a flowchart of an embodiment of a power management method of the invention.

FIG. 3 is a flowchart of an embodiment of a power management method of the invention. As aforementioned, the power management method of the invention can be performed by the power management module 236 shown in FIG. 2. Please refer FIG. 1 together with FIG. 2. First, when the computer system is operated in the working state and the processor 210 enters into a lowest power consumption state C4 among the control states, in step S310, the power management module 236 detects states of the peripheral modules 238 to determine whether a specific condition is matched (step S320). Note that the power management module 236 detects the states of the peripheral modules 238 (e.g. power states of the peripheral modules 238) to determine whether the specific condition is matched when the peripheral modules 238 are idle for a predetermined time period. Since each of the peripheral modules 238 has a low power consumption state, the power management module 236 detects states of the peripheral modules 238 to determine whether a specific condition is matched by determining whether predetermined peripheral modules among the peripheral modules are operated in the corresponding low power consumption states. In one embodiment, the predetermined peripheral modules may include, for example and are not limited to, a memory controller, a graphic controller, a USB controller and a SATA controller, and the power management module determines the specific condition is matched when the following conditions have been satisfied:

(1) the memory controller is operated in a self-refresh mode;

(2) the graphic controller is operated in a snapshot mode;

(3) the USB controller configures USB devices to be operated in a D3 mode; and (4) the SATA controller configures SATA devices to be operated in a partial/slumber mode.

In other words, the power management module 236 determines the specific condition is matched only when all of the conditions (1)-(4) have been matched, otherwise, the specific condition is determined to not be matched. As aforementioned, as the determination is performed when all of the peripheral modules 238 are idle for a predetermined time period, in addition to matching the conditions (1)-(4) of the states of the predetermined peripheral modules 238, other peripheral modules 238 must be operated in idle states.

If following detection, the states of the peripheral modules 238 do not match to the specific condition (No in step S320), e.g. the conditions (1)-(4) do not match or any predefined wake-up event occurs, no further process is performed and the process ends.

If following detection, the states of the peripheral modules match to the specific condition (Yes in step S320), the power management module 236 directs the processor 210 to a PLL control state to control the PLL 232 according to a predefined control state configuration (step S330). For example, in one embodiment, a control state configuration option is provided in a basic input/output system (BIOS) of the computer system (not shown) to configure the control state for which the PLL control state has been entered. In this embodiment, the PLL control state has two control state configuration values, a first control state (C4PG) and a second control state (C4PD). The configured configuration value will be stored in a register (not shown) in which the configuration value 1 represents the first control state while the configuration value 0 represents the second control state.

Figure 4:
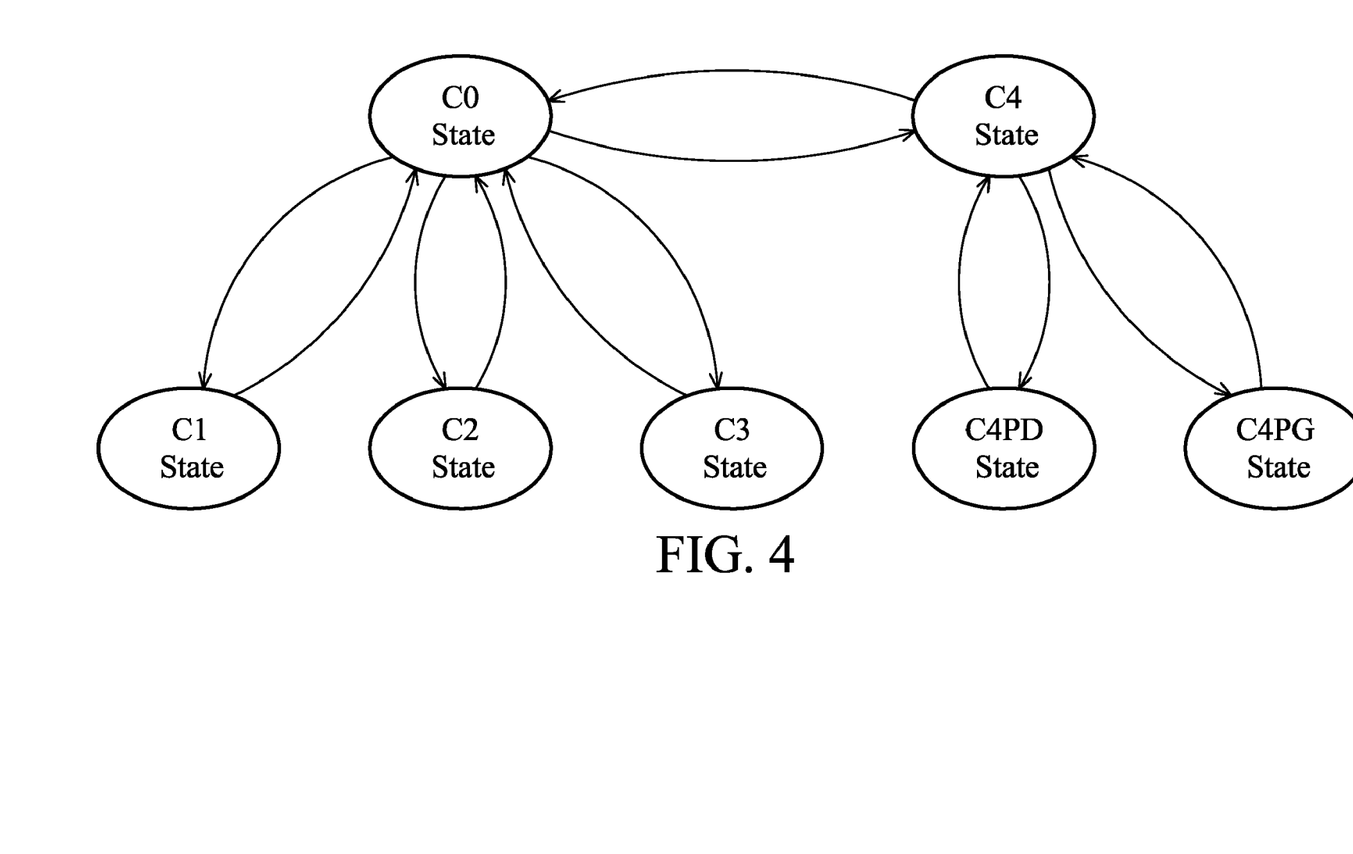
FIG. 4 is a schematic diagram of processor power states according to the invention.

FIG. 4 is a schematic diagram of processor power states according to the invention. As shown in FIG. 4, the processor power states include a working state C0, a first power saving state C1, a second power saving state C2, a third power saving state C3, a lowest power consumption state C4 and two possible PLL control states C4PG (first control state) and C4PD (second control state). Note that the states C0 to C4 are similar to corresponding states in FIG. 1 and the PLL control states C4PG and C4PD are selectively entered according to the configuration value in the register. For example, when the processor 210 enters the lowest power consumption state C4 and the configuration value in the register is set to be 1, the processor 210 will enter the first control state (C4PG). Contrarily, when the processor 210 enters the lowest power consumption state C4 and the configuration value in the register is set to be 0, the processor 210 will enter the second control state (C4PD). When the processor 210 enters the first or second control state, if any wake-up event is detected to occur, the power management module 236 performs a resume procedure to resume the processor 210 to the lowest power consumption state C4.

In step S330, when the control state is configured to the first control state, the power management module 236 sends a control signal PLLG to the gating unit 234 to stop the clock output of the PLL 232. Meanwhile, the clock output of the PLL 232 is gated, and the PLL has yet to be powered down. When the control state is configured to the second control state, the power management module 236 sends a control signal PLLD to the PLL 232. When the PLL 121 receives the control signal PLLD, the PLL 232 will be fully powered down (turned off). In one embodiment, when the control state is configured to the second control state, the power management module 236 may separately send the control signal PLLD and a control signal C4PSTOP (third control signal) to the PLL 232 and the clock generator 220 that is external to the chipset 230 (i.e. a source clock generator corresponding to the PLL 232). When the PLL 232 receives the control signal PLLD, the PLL 232 will be fully powered down. When receiving the control signal C4PSTOP, the clock generator 220 stops outputting of the clock signal to the PLL 232.

When the processor 210 enters the PLL control state, if any wake-up event is detected to occur, the power management module 236 will perform a resume procedure to resume the processor 210 from a current state to the lowest power consumption state C4.

Figure 5:
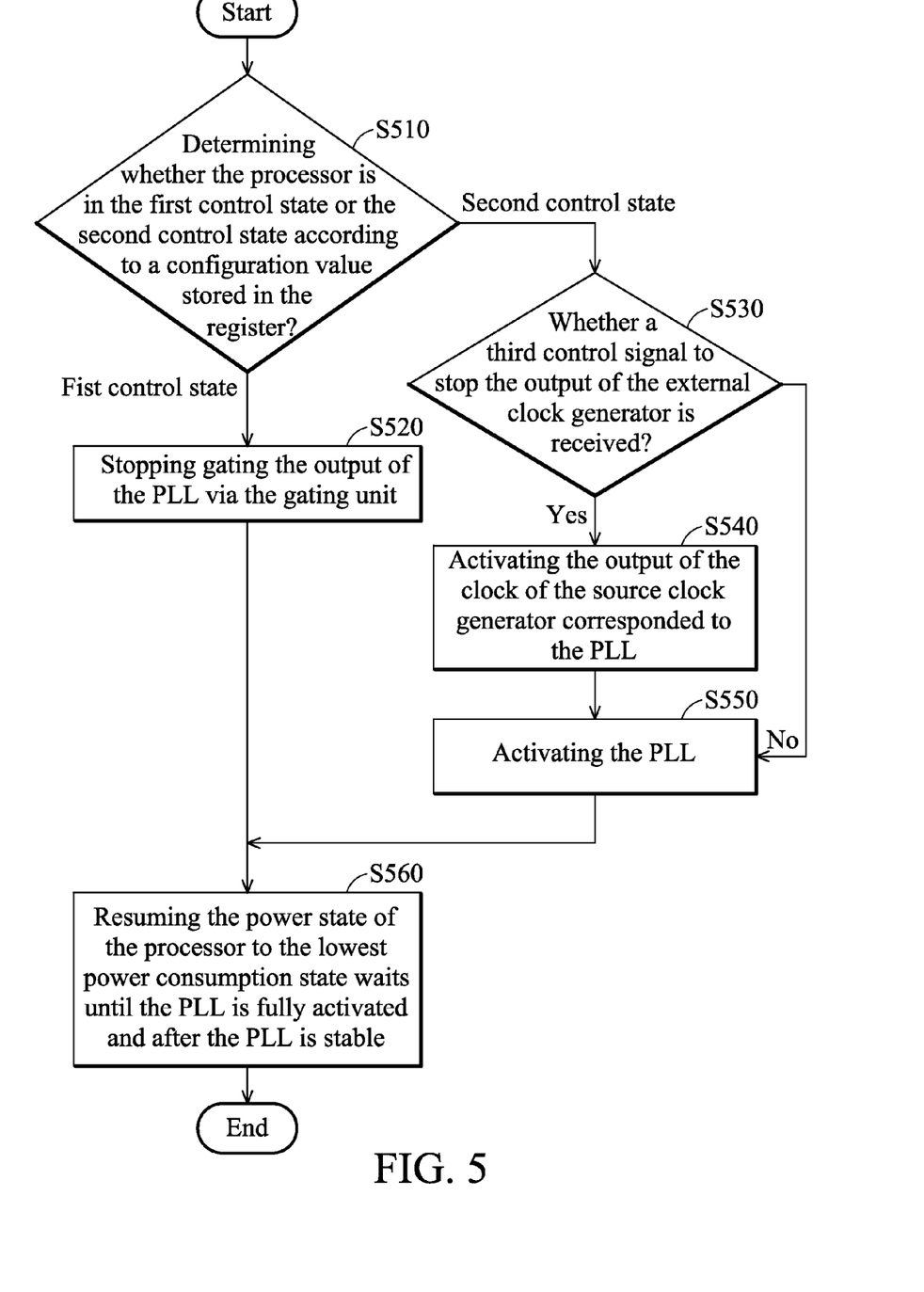
FIG. 5 is a flowchart of an embodiment of a resume procedure of the invention.

FIG. 5 is a flowchart of an embodiment of a resume procedure of the invention. As aforementioned, the resume procedure of the invention can be performed by the power management module 236 shown in FIG. 2. Please refer FIG. 5 together with FIG. 4. As shown in FIG. 5, in step S510, the power management module 236 first determines whether the processor 210 is in the first control state or the second control state according to a configuration value stored in the register. For example, in one embodiment, the processor 210 may be determined to be configured in the first control state or the second control state in response to a configuration value of 1 or 0 in the register, respectively. If the processor 210 is in the first control state, it represents that the processor 210 is preparing to resume from the first control state to the C4 state. Contrarily, if the processor 210 is in the second control state, it represents that the processor 210 is preparing to resume from the second control state to the C4 state. When the processor 210 is determined as being configured in the first control state in response to a configuration value of 1, in step S520, since the PLL 232 has not been powered down and only the clock output thereof is gated by the gating unit 234, the resume procedure stops directly gating the output of the PLL via the gating unit 234 and step S560 is further performed. When the processor 210 is determined as being configured in the second control state, it is further determined that whether the control signal C4PSTOP has been received by the clock generator 220 in step S530. If not, it represents that the clock generator 220 has not stopped outputting the clock signal, otherwise, it represents that output of the clock signal has been stopped by the clock generator 220. If the clock generator 220 receives the control signal C4PSTOP (Yes in step S530), the PLL 232 has been powered down and the output of the external clock generator has been stopped and thus the resume procedure performs steps S540 and S550 to re-start the stopped clock and activate the PLL 232. In step S540, the resume procedure first activates the output of the clock of the source clock generator corresponded to the PLL 232 (i.e. the clock generator 220) and then in step S550, activates the PLL 232 when the source clock generator has been activated. Thereafter, step S560 is further performed. If the clock generator 220 does not receive the control signal C4PSTOP (No in step S530), the output of the external clock generator has not been stopped and thus the resume procedure performs the step S550 only to activate the PLL 232 and step S560 is further performed. In step S560, the resume procedure waits until the PLL 232 is fully activated and when the PLL 232 is stable and resumes the power state of the processor 210 to the lowest power consumption state C4.

Following illustrates an embodiment of the power management method according to the invention, but the invention is not limited thereto.

In this embodiment, it is assumed that the processor 210 has already entered into the lowest power consumption state C4 since it has been idle for a predetermined time period and the configuration value in the register is set to be 0. When all of the peripheral modules 238 are idle for a predetermined time period, the power management module 236 detects the states of the peripheral modules 238 to determine whether the specific condition is matched, i.e. whether the aforementioned conditions (1)-(4) are all matched. It is assumed that all of the conditions (1)-(4) have been matched, which indicates that the specific condition has been matched, so the power management module 236 directs the processor 210 to a PLL control state to control the PLL 232 according to a predefined control state configuration. Since the configuration value in the register is 0, which represents that the second control state is to be entered, the power management module 236 sends a control signal PLLD to the PLL 232. When the PLL 121 receives the control signal PLLD, the PLL 232 will be fully powered down.

In one embodiment, the configuration value in the register is set to be 0, which represents that the second control state is to be entered, so the power management module 236 may separately send the control signal PLLD and the control signal C4PSTOP (third control signal) to the PLL 232 and the clock generator 220 that is external to the chipset 230. When the PLL 232 receives the control signal PLLD, the PLL 232 will be fully powered down. When receiving the control signal C4PSTOP, the clock generator 220 stops outputting of the clock signal to the PLL 232. Thus, the processor 210 enters the second control state and the PLL 232 has been powered down and output of the external clock generator has been stopped. Thereafter, if a wake-up event is detected to occur, the power management module 236 will perform a resume procedure to resume the processor 210 from a current state to the lowest power consumption state C4. Since the control signal C4PSTOP has been received by the clock generator 220, which represents that the PLL 232 has been powered down and the output of the external clock generator has been stopped, the resume procedure first activates the output of the clock of the clock generator 220 to resume the output thereof and then activates the PLL 232 and resumes the processor 210 from a current state to the lowest power consumption state C4 when the clock generator 220 has been activated.

In summary, according to the power management methods and chipsets and computer systems using the same of the invention, PLL control for the processor entering the lowest power consumption state (i.e. the state C4) can be provided through the added PLL control states and the power consumption of the computer system can be efficiently. Specifically, power consumption of the computer system is efficiently reduced due to the computer system being more frequently run in a lowest power state, while normally operating.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Certain terms are used throughout the descriptions and claims to refer to particular system components. As one skilled in the art will appreciate, consumer electronic equipment manufacturers may refer to a component by different names. This document does not intend to distinguish between components that differ in name but not function.

While the invention has been described by way of example and in terms of embodiment, it is to be understood that the invention is not limited thereto. Those who are skilled in this technology can still make various alterations and modifications without departing from the scope and spirit of this invention. Therefore, the scope of the disclosure embodiment shall be defined and protected by the following claims and their equivalents.

What is claimed is:

1. A power management method performed in a computer system having a processor, a power management module coupled to a plurality of peripheral modules and a phase lock loop circuit (PLL), wherein the computer system and the processor are capable of being operated in a working state and a plurality of power saving states, comprising:
   when the computer system is operated in the working state and the processor is entered into a lowest power consumption state among the power saving states, detecting, by the computer system, states of the peripheral modules to determine whether a specific condition is matched; and
   if following detection, the states of the peripheral modules match to the specific condition, directing, by the computer system, the processor to a control state to control the PLL according to a control state configuration.

2. The power management method of claim 1, wherein the step of directing the processor to a control state to control the PLL according to a control state configuration further comprises:
   sending a first control signal for gating a clock output of the PLL when the control state is configured as a first control state; and
   sending a second control signal to power down the PLL when the control state is configured as a second control state.

3. The power management method of claim 2, wherein when detecting that a wake-up event has occurred in the control state, performing a resume procedure to direct the processor to resume to the lowest power consumption state and when the control state is configured as the first control state, the resume procedure stops gating the clock output of the PLL.

4. The power management method of claim 2, wherein when detecting that a wake-up event has occurred in the control state, performing a resume procedure to direct the processor to resume to the lowest power consumption state and when the control state is configured as the second control state, the resume procedure activates the output of the clock of a source clock generator corresponded to the PLL.

5. The power management method of claim 1, wherein the step of directing the processor to a control state to control the PLL according to a control state configuration further comprises:

sending a second control signal and a third control signal to power down the PLL and stopping output of a source clock generator corresponded to the PLL when the control state is configured as a second control state.

6. The power management method of claim 5, wherein when detecting that a wake-up event has occurred in the control state, performing a resume procedure to direct the processor to resume to the lowest power consumption state and when the control state is configured as the second control state and the third control signal has been sent, the resume procedure activates the output of the clock of a source clock generator corresponded to the PLL and activates the PLL when the source clock generator PLL has been activated.

7. The power management method of claim 1, further comprising:

providing a control state configuration option to configure the control state in a basic input/output system (BIOS).

8. The power management method of claim 1, wherein each of the peripheral modules has a low power consumption state and the step of detecting states of the peripheral modules to determine whether the specific condition is matched is determining whether predetermined peripheral modules among the peripheral modules are operated in the corresponding low power consumption states.

9. The power management method of claim 8, wherein the predetermined peripheral modules comprise a memory controller, a graphic controller, a USB controller and a SATA controller, and the power management module determines the specific condition is matched when the following conditions have been satisfied:

the memory controller is operated in a self-refresh mode;
the graphic controller is operated in a snapshot mode;
the USB controller configures USB devices to be operated in a D3 mode; and
the SATA controller configures SATA devices to be operated in a partial/slumber mode.

10. The power management method of claim 1, wherein the step of detecting states of the peripheral modules to determine whether the specific condition is matched is performed when the peripheral modules are idle for a predetermined time period.

11. A chipset coupled to a clock generator and a processor, comprising:

a phase lock loop circuit (PLL), generating at least one second clock signal according to a first clock signal generated by the clock generator;
a gating unit coupled to the PLL, controlling the output of the second clock signal generated by the PLL;
a plurality of peripheral modules, each of which having a low power consumption state; and
a power management module coupled to the gating unit, the peripheral modules and the PLL,
wherein when the processor enters into a lowest power consumption state among the power saving states, the power management module detects states of the peripheral modules to determine whether a specific condition is matched and if following detection, the states of the peripheral modules match to the specific condition, directs the processor to a control state to control the PLL according to a control state configuration.

12. The chipset of claim 11, wherein the power management module sends a first control signal to the gating unit for gating the second clock signal output of the PLL when the control state is configured as a first control state and sends a second control signal to power down the PLL when the control state is configured as a second control state.

13. The chipset of claim 12, wherein when detecting that a wake-up event has occurred in the control state, the power management module further performs a resume procedure to direct the processor to resume to the lowest power consumption state and when the control state is configured as the first control state, the resume procedure stops gating the second clock signal output of the PLL via the gating unit.

14. The chipset of claim 12, wherein when detecting that a wake-up event has occurred in the control state, the power management unit performs a resume procedure to direct the processor to resume to the lowest power consumption state and when the control state is configured as the second control state, the resume procedure activates the output of the clock of the source clock generator corresponded to the PLL.

15. The chipset of claim 11, wherein the power management module sends a second control signal and a third control signal to the PLL and the clock generator respectively for powering down the PLL and stopping output of a source clock generator corresponded to the PLL when the control state is configured as a second control state.

16. The chipset of claim 15, wherein when detecting that a wake-up event has occurred in the control state, the power management unit performs a resume procedure to direct the processor to resume to the lowest power consumption state and when the control state is configured as the second control state, the resume procedure activates the output of the clock of the source clock generator corresponded to the PLL and when the source clock generator PLL has been activated, activates the PLL.

17. The chipset of claim 11, wherein each of the peripheral modules has a low power consumption state and the power management module further determines whether the specific condition has been matched by determining whether predetermined peripheral modules among the peripheral modules are operated in the corresponding low power consumption states.

18. The chipset of claim 17, wherein the predetermined peripheral modules comprise a memory controller, a graphic controller, a USB controller and a SATA controller, and the power management module determines the specific condition is matched when the following conditions have been satisfied:

the memory controller is operated in a self-refresh mode;
the graphic controller is operated in a snapshot mode;
the USB controller configures USB devices to be operated in a D3 mode; and
the SATA controller configures SATA devices to be operated in a partial/slumber mode.

19. The chipset of claim 11, wherein the power management module further detects states of the peripheral modules to determine whether the specific condition is matched when the peripheral modules are idle for a predetermined time period.

20. A computer system, comprising:

a clock generator, generating a first clock signal;
a processor; and a chipset coupled to the clock generator and the processor, comprising:
a phase lock loop circuit (PLL), generating at least one second clock signal according to the first clock signal;
a gating unit coupled to the PLL, controlling the output of the second clock signal generated by the PLL;
a plurality of peripheral modules, each of which having a low power consumption state; and
a power management module coupled to the gating unit, the peripheral modules and the PLL, wherein when the computer system is operated in a working state and the processor enters into a lowest power consumption state among the power saving states, the power management module detects states of the peripheral modules to determine whether a specific condition is matched and if following detection, the states of the peripheral modules match to the specific condition, directs the processor to a control state to control the PLL according to a control state configuration.

21. The computer system of claim 20, wherein the power management module sends a first control signal to the gating unit for gating the second clock signal output of the PLL when the control state is configured as a first control state and sends a second control signal to power down the PLL when the control state is configured as a second control state.

22. The computer system of claim 20, wherein the power management module sends a second control signal and a third control signal to the PLL and the clock generator respectively for powering down the PLL and stopping output of the clock of the clock generator corresponded to the PLL when the control state is configured as a second control state.

23. The computer system of claim 20, wherein each of the peripheral modules has a low power consumption state and the power management module further determines whether the specific condition has been matched by determining whether predetermined peripheral modules among the peripheral modules are operated in the corresponding low power consumption states.

24. The computer system of claim 23, wherein the predetermined peripheral modules comprise a memory controller, a graphic controller, a USB controller and a SATA controller, and the power management module determines the specific condition is matched when the following conditions have been satisfied:

- the memory controller is operated in a self-refresh mode;
- the graphic controller is operated in a snapshot mode;
- the USB controller configures USB devices to be operated in a D3 mode; and
- the SATA controller configures SATA devices to be operated in a partial/slumber mode.

* * * * *